US008632850B2

(12) United States Patent
Schultz et al.

(10) Patent No.: US 8,632,850 B2
(45) Date of Patent: Jan. 21, 2014

(54) FRICTION FABRICATION TOOLS

(75) Inventors: Jeffrey Patrick Schultz, Blacksburg, VA (US); Kevin Creehan, Blacksburg, VA (US)

(73) Assignee: Schultz-Creehan Holdings, Inc., Blacksburg, VA (US)

( * ) Notice: Subject to any disclaimer, the term of this patent is extended or adjusted under 35 U.S.C. 154(b) by 246 days.

(21) Appl. No.: 12/987,588

(22) Filed: Jan. 10, 2011

(65) Prior Publication Data

US 2012/0009339 A1    Jan. 12, 2012

Related U.S. Application Data

(63) Continuation-in-part of application No. 12/792,655, filed on Jun. 2, 2010, which is a continuation-in-part of application No. 11/527,149, filed on Sep. 26, 2006, now abandoned.

(60) Provisional application No. 60/720,521, filed on Sep. 26, 2005, provisional application No. 61/293,543, filed on Jan. 8, 2010.

(51) Int. Cl.
  *C23C 26/00*   (2006.01)
  *B05D 1/12*    (2006.01)
  *B05D 1/36*    (2006.01)
  *B05D 3/00*    (2006.01)
  *B05D 5/00*    (2006.01)

(52) U.S. Cl.
  USPC ............................. 427/11; 427/180; 427/264

(58) Field of Classification Search
  USPC ........................................... 427/11, 180, 264
  See application file for complete search history.

(56) References Cited

U.S. PATENT DOCUMENTS 3,217,957 A    11/1965   Jarvie et al.
3,279,971 A    10/1966   Gardener
(Continued)

FOREIGN PATENT DOCUMENTS

EP    0453182 A    10/1991
EP    0458774 A    11/1991
(Continued)

OTHER PUBLICATIONS

Berbon et al., Friction stir processing: a tool to homogenize nanocomposite aluminum alloys, Scripta Materialia, vol. 44, No. 1, pp. 61-66, Jan. 5, 2001.
(Continued)

*Primary Examiner* — Kelly M Gambetta
(74) *Attorney, Agent, or Firm* — New River Valley IP Law; Michele L. Mayberry

(57) ABSTRACT

The present invention relates to tooling and methods for disposing, coating, building up, repairing, or otherwise modifying the surface of a metal substrate using frictional heating and compressive loading of a consumable metal material against the substrate. Embodiments of the invention include friction-based fabrication tooling comprising a non-consumable member with a throat and a consumable member disposed in the throat, wherein the throat is operably configured such that during rotation of the non-consumable member at a selected speed, the throat exerts normal forces on and rotates the consumable member at the selected speed; and comprising means for dispensing the consumable member through the throat and onto a substrate using frictional heating and compressive loading. Embodiments of the invention also include fabrication methods using the tools described herein.

4 Claims, 13 Drawing Sheets

Square Through-hole Stirring Tool

Elliptical Through-hole Stirring Tool

(56) References Cited

U.S. PATENT DOCUMENTS

| | | | |
|---|---|---|---|
| 3,292,838 A | 12/1966 | Farley | |
| 3,418,196 A | 12/1968 | Jane | |
| 3,444,611 A | 5/1969 | Bogart | |
| 3,455,015 A | 7/1969 | Daniels et al. | |
| 3,466,737 A | 9/1969 | Hanink | |
| 3,495,321 A | 2/1970 | Shaff | |
| 3,537,172 A | 11/1970 | Voznesensky et al. | |
| 3,831,262 A | 8/1974 | Luc | |
| 3,899,377 A | 8/1975 | Luc | |
| 3,949,896 A | 4/1976 | Luc | |
| 4,106,167 A | 8/1978 | Luc | |
| 4,144,110 A | 3/1979 | Luc | |
| 4,491,001 A | 1/1985 | Yoshida et al. | |
| 4,625,095 A | 11/1986 | Das | |
| 4,930,675 A * | 6/1990 | Bedford et al. | 228/114.5 |
| 4,959,241 A | 9/1990 | Thomas et al. | |
| 5,056,971 A | 10/1991 | Sartori | |
| 5,249,778 A | 10/1993 | Steichert et al. | |
| 5,262,123 A | 11/1993 | Thomas et al. | |
| 5,330,160 A | 7/1994 | Eisermann et al. | |
| 5,460,317 A | 10/1995 | Thomas et al. | |
| 5,469,617 A | 11/1995 | Thomas et al. | |
| 5,611,479 A | 3/1997 | Rosen | |
| 5,637,836 A | 6/1997 | Nakagawa et al. | |
| 5,697,511 A | 12/1997 | Bampton | |
| 5,697,544 A | 12/1997 | Wykes | |
| 5,713,507 A | 2/1998 | Holt et al. | |
| 5,718,366 A | 2/1998 | Colligan | |
| 5,769,306 A | 6/1998 | Colligan | |
| 5,794,835 A | 8/1998 | Colligan et al. | |
| 5,813,592 A | 9/1998 | Midling et al. | |
| 5,826,664 A | 10/1998 | Richardson | |
| 5,893,507 A | 4/1999 | Ding et al. | |
| 5,971,247 A | 10/1999 | Gentry | |
| 5,971,252 A | 10/1999 | Rosen et al. | |
| 5,975,406 A | 11/1999 | Mahoney et al. | |
| 6,029,879 A | 2/2000 | Cocks | |
| 6,045,027 A | 4/2000 | Rosen et al. | |
| 6,045,028 A | 4/2000 | Martin et al. | |
| 6,050,474 A | 4/2000 | Aota et al. | |
| 6,050,475 A | 4/2000 | Kinton et al. | |
| 6,051,325 A | 4/2000 | Talwar et al. | |
| 6,053,391 A | 4/2000 | Heideman et al. | |
| 6,070,784 A | 6/2000 | Holt et al. | |
| 6,119,624 A | 9/2000 | Morikawa et al. | |
| 6,138,895 A | 10/2000 | Oelgoetz et al. | |
| 6,168,066 B1 | 1/2001 | Arbegast | |
| 6,168,067 B1 | 1/2001 | Waldron et al. | |
| 6,173,880 B1 | 1/2001 | Ding et al. | |
| 6,193,137 B1 | 2/2001 | Ezumi et al. | |
| 6,199,745 B1 | 3/2001 | Campbell et al. | |
| 6,206,268 B1 | 3/2001 | Mahoney | |
| 6,213,379 B1 | 4/2001 | Takeshita et al. | |
| 6,227,430 B1 | 5/2001 | Rosen et al. | |
| 6,230,957 B1 | 5/2001 | Arbegast et al. | |
| 6,237,829 B1 | 5/2001 | Aota et al. | |
| 6,237,835 B1 | 5/2001 | Litwinski et al. | |
| 6,247,633 B1 | 6/2001 | White et al. | |
| 6,247,634 B1 | 6/2001 | Whitehouse | |
| 6,250,037 B1 | 6/2001 | Ezumi et al. | |
| 6,257,479 B1 | 7/2001 | Litwinski et al. | |
| 6,259,052 B1 | 7/2001 | Ding et al. | |
| 6,264,088 B1 | 7/2001 | Larsson | |
| 6,273,323 B1 | 8/2001 | Ezumi et al. | |
| 6,276,591 B1 | 8/2001 | Kawasaki et al. | |
| 6,290,117 B1 | 9/2001 | Kawasaki et al. | |
| 6,299,048 B1 | 10/2001 | Larsson | |
| 6,299,050 B1 | 10/2001 | Okamura et al. | |
| 6,302,315 B1 | 10/2001 | Thompson | |
| 6,305,866 B1 | 10/2001 | Aota et al. | |
| 6,311,889 B1 | 11/2001 | Ezumi et al. | |
| 6,315,187 B1 | 11/2001 | Satou et al. | |
| 6,321,975 B1 | 11/2001 | Kawasaki et al. | |
| 6,325,273 B1 | 12/2001 | Boon et al. | |
| 6,328,261 B1 | 12/2001 | Wollaston et al. | |
| 6,352,193 B1 | 3/2002 | Bellino et al. | |
| 6,354,483 B1 | 3/2002 | Ezumi et al. | |
| 6,360,937 B1 | 3/2002 | De Koning | |
| 6,364,197 B1 | 4/2002 | Oelgoetz et al. | |
| 6,367,681 B1 | 4/2002 | Waldron et al. | |
| 6,378,264 B1 | 4/2002 | Kawasaki et al. | |
| 6,378,754 B2 | 4/2002 | Aota et al. | |
| 6,382,498 B2 | 5/2002 | Aota et al. | |
| 6,386,425 B2 | 5/2002 | Kawasaki et al. | |
| 6,398,883 B1 | 6/2002 | Forrest et al. | |
| 6,413,610 B1 | 7/2002 | Nakamura et al. | |
| 6,419,142 B1 | 7/2002 | Larsson | |
| 6,419,144 B2 | 7/2002 | Aota | |
| 6,421,578 B1 | 7/2002 | Adams et al. | |
| 6,422,449 B1 | 7/2002 | Ezumi et al. | |
| 6,450,394 B1 | 9/2002 | Wollaston et al. | |
| 6,450,395 B1 | 9/2002 | Weeks et al. | |
| 6,457,629 B1 | 10/2002 | White | |
| 6,460,752 B1 | 10/2002 | Waldron et al. | |
| 6,461,072 B2 | 10/2002 | Kawasaki et al. | |
| 6,464,127 B2 | 10/2002 | Litwinski et al. | |
| 6,471,112 B2 | 10/2002 | Satou et al. | |
| 6,474,533 B1 | 11/2002 | Ezumi et al. | |
| 6,484,924 B1 | 11/2002 | Forrest | |
| 6,494,011 B2 | 12/2002 | Ezumi et al. | |
| 6,497,355 B1 | 12/2002 | Ding et al. | |
| 6,499,649 B2 | 12/2002 | Sayama et al. | |
| 6,502,739 B2 | 1/2003 | Ezumi et al. | |
| 6,513,698 B2 | 2/2003 | Ezumi et al. | |
| 6,516,992 B1 | 2/2003 | Colligan | |
| 6,527,470 B2 | 3/2003 | Ezumi et al. | |
| 6,543,671 B2 | 4/2003 | Hatten et al. | |
| 6,572,007 B1 | 6/2003 | Stevenson et al. | |
| 6,648,206 B2 | 11/2003 | Nelson et al. | |
| 6,669,075 B2 | 12/2003 | Colligan | |
| 6,722,556 B2 | 4/2004 | Schilling et al. | |
| 6,732,901 B2 | 5/2004 | Nelson et al. | |
| 6,745,929 B1 | 6/2004 | Ezumi et al. | |
| 6,758,382 B1 | 7/2004 | Carter | |
| 6,779,704 B2 | 8/2004 | Nelson et al. | |
| 6,866,181 B2 | 3/2005 | Aota et al. | |
| 6,953,140 B2 | 10/2005 | Park et al. | |
| 7,036,708 B2 | 5/2006 | Park et al. | |
| 7,066,375 B2 | 6/2006 | Bolser | |
| 7,124,929 B2 | 10/2006 | Nelson et al. | |
| 7,152,776 B2 | 12/2006 | Nelson et al. | |
| 7,156,276 B2 | 1/2007 | Slattery | |
| 7,163,136 B2 | 1/2007 | Hempstead | |
| 7,597,236 B2 | 10/2009 | Tolle et al. | |
| 7,608,296 B2 | 10/2009 | Packer et al. | |
| 7,624,910 B2 | 12/2009 | Barnes et al. | |
| 7,661,572 B2 | 2/2010 | Nelson et al. | |
| 2002/0011509 A1 | 1/2002 | Nelson et al. | |
| 2002/0014516 A1 | 2/2002 | Nelson et al. | |
| 2002/0168466 A1 | 11/2002 | Tapphorn et al. | |
| 2002/0179682 A1 | 12/2002 | Schilling et al. | |
| 2003/0010805 A1 | 1/2003 | Nelson et al. | |
| 2003/0042292 A1 | 3/2003 | Hatten et al. | |
| 2003/0075584 A1 | 4/2003 | Sarik et al. | |
| 2004/0118899 A1 | 6/2004 | Aota et al. | |
| 2004/0134972 A1 | 7/2004 | Nelson et al. | |
| 2004/0155093 A1 | 8/2004 | Nelson et al. | |
| 2004/0265503 A1 | 12/2004 | Clayton | |
| 2005/0006439 A1 | 1/2005 | Packer et al. | |
| 2005/0045695 A1 | 3/2005 | Subramanian et al. | |
| 2005/0051599 A1 | 3/2005 | Park et al. | |
| 2005/0060888 A1 | 3/2005 | Park et al. | |
| 2005/0127139 A1 | 6/2005 | Slattery et al. | |
| 2005/0210820 A1 | 9/2005 | Tanaka et al. | |
| 2005/0242158 A1 | 11/2005 | Bolser | |
| 2006/0016854 A1 | 1/2006 | Slattery | |
| 2006/0060635 A1 | 3/2006 | Slattery | |
| 2006/0096740 A1 | 5/2006 | Zheng | |
| 2006/0208034 A1 | 9/2006 | Packer et al. | |
| 2007/0040006 A1 | 2/2007 | Charles et al. | |
| 2007/0075121 A1 | 4/2007 | Slattery | |
| 2007/0102492 A1 | 5/2007 | Nelson et al. | |
| 2007/0138236 A1 | 6/2007 | Agarwal et al. | |
| 2007/0187465 A1 | 8/2007 | Eyre et al. | |

(56) References Cited

U.S. PATENT DOCUMENTS

| | | |
|---|---|---|
| 2007/0241164 A1 | 10/2007 | Barnes et al. |
| 2007/0295781 A1* | 12/2007 | Hunt et al. .................... 228/2.1 |
| 2007/0297935 A1 | 12/2007 | Langan et al. |
| 2008/0041921 A1 | 2/2008 | Creehan et al. |
| 2009/0188101 A1 | 7/2009 | Durandet et al. |
| 2009/0258232 A1 | 10/2009 | Brice |
| 2010/0089976 A1 | 4/2010 | Szymanski et al. |
| 2010/0089977 A1 | 4/2010 | Chen et al. |
| 2010/0146866 A1 | 6/2010 | Nelson et al. |
| 2010/0258612 A1 | 10/2010 | Kolbeck et al. |

FOREIGN PATENT DOCUMENTS

| | | |
|---|---|---|
| EP | 0458774 A1 | 11/1991 |
| EP | 0410104 B1 | 7/1993 |
| EP | 0597335 A | 5/1994 |
| EP | 0597335 A1 | 5/1994 |
| GB | 572789 A | 10/1945 |
| GB | 1224891 A | 3/1971 |
| GB | 2270864 A | 3/1994 |
| GB | 2306366 | 5/1997 |
| JP | 11267857 A | 10/1999 |
| RU | 1393566 | 5/1988 |

OTHER PUBLICATIONS

Friction Stir Tooling: Tool Materials and Designs, Chapter 2 in Friction Stir Welding and Processing, pp. 7-35, ASM International, Editors Rajiv S. Mishra & Murray W. Mahoney, 2007.

Metal-Matrix Composites (ASM Metals Handbook Online, ASM International, 2002), Introduction, Aluminum-Matrix Composites.

International Search Report and Written Opinion of International Application No. PCT/US2012/032793, Dec. 18, 2012.

* cited by examiner

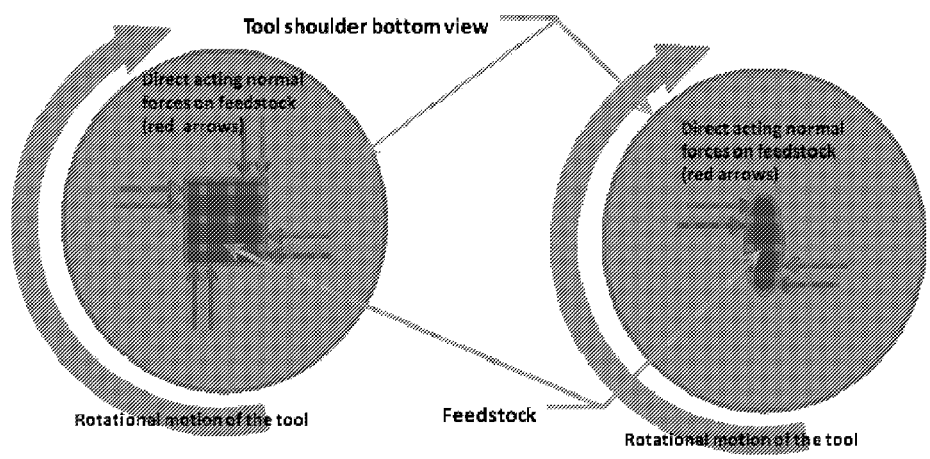
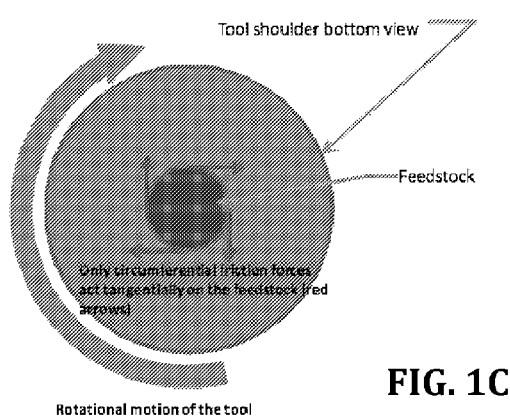
FIGS. 1A-C

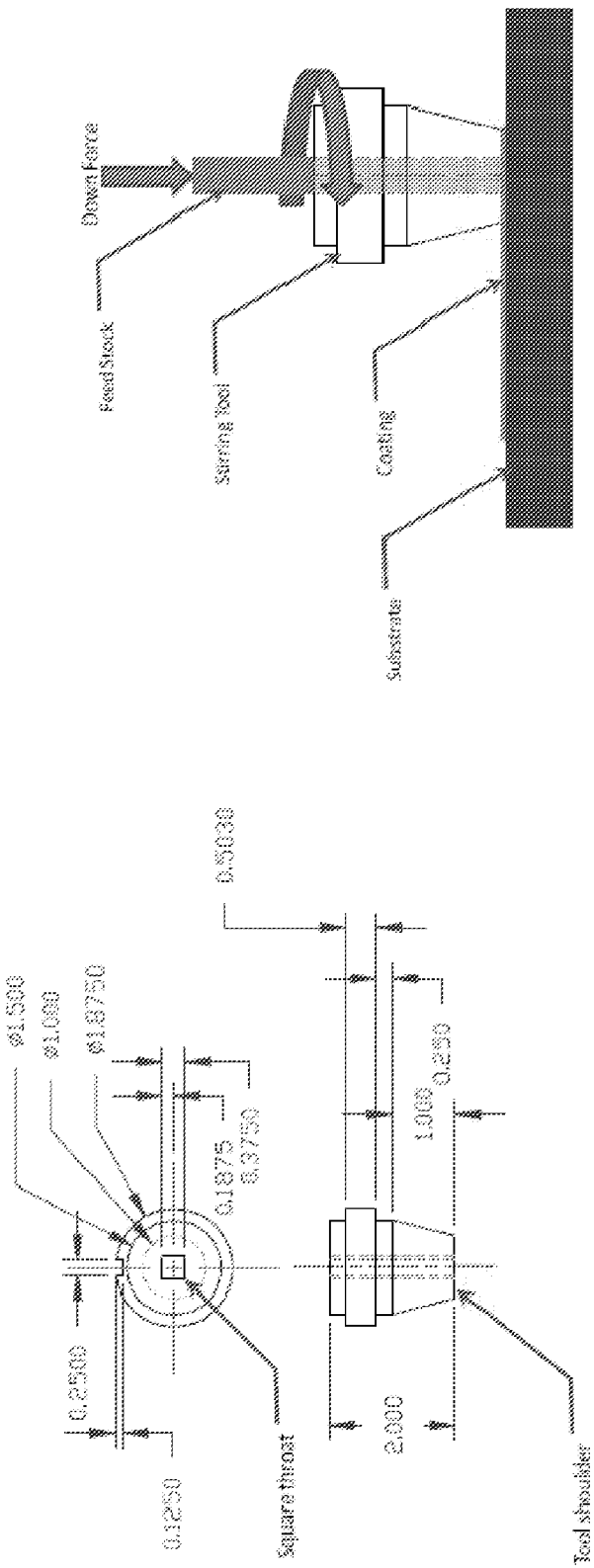
FIGS. 2A-B

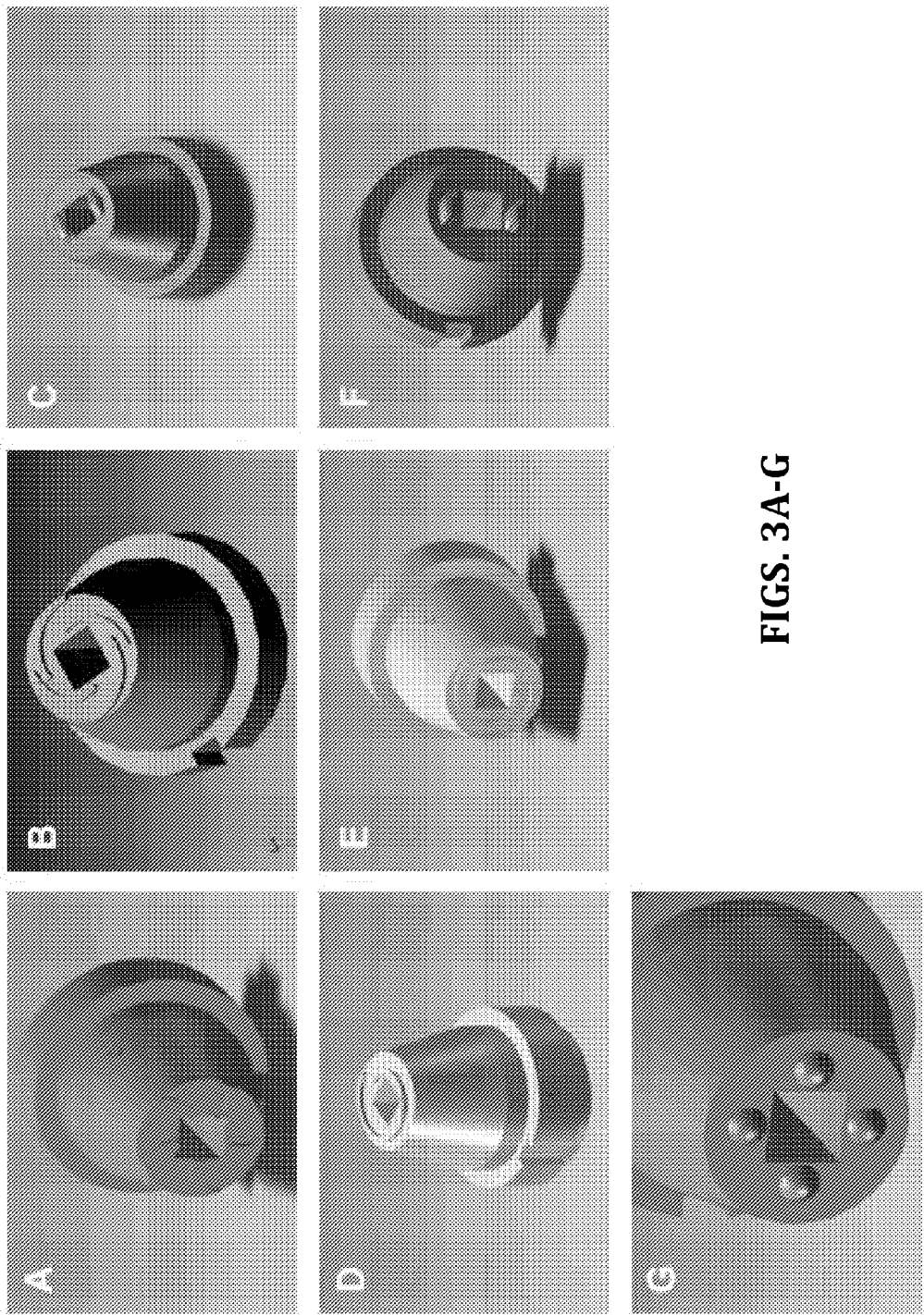
FIGS. 3A-G

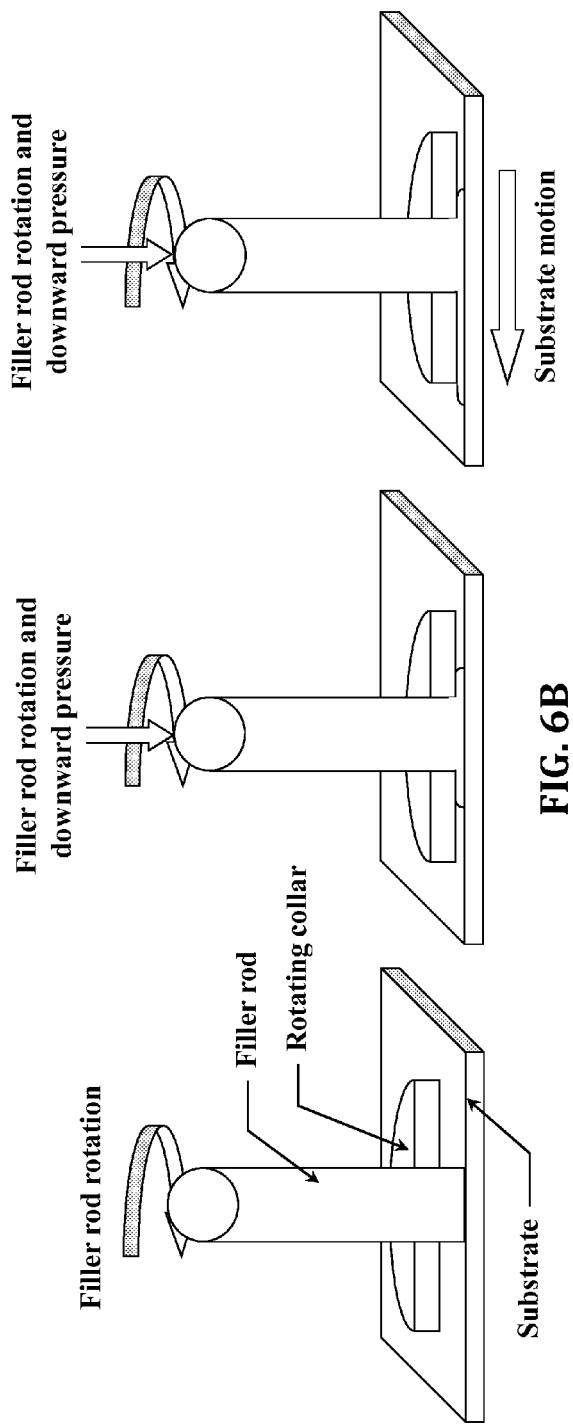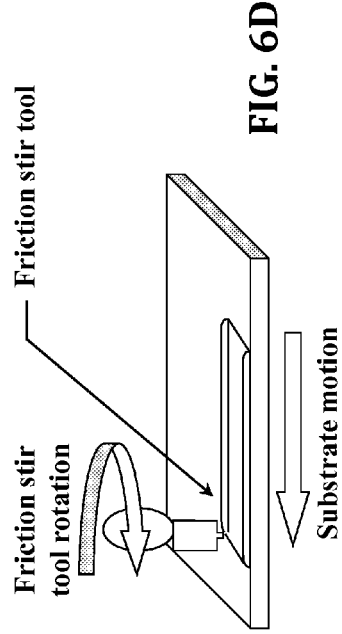
FIG. 6A
FIG. 6B
FIG. 6C
FIG. 6D
FIGS. 6A-D

Substrate with hole

Backing plate

Powder

Rotation and downward pressure
stirring tool

Added layer

Powder

FIGS. 7A-F

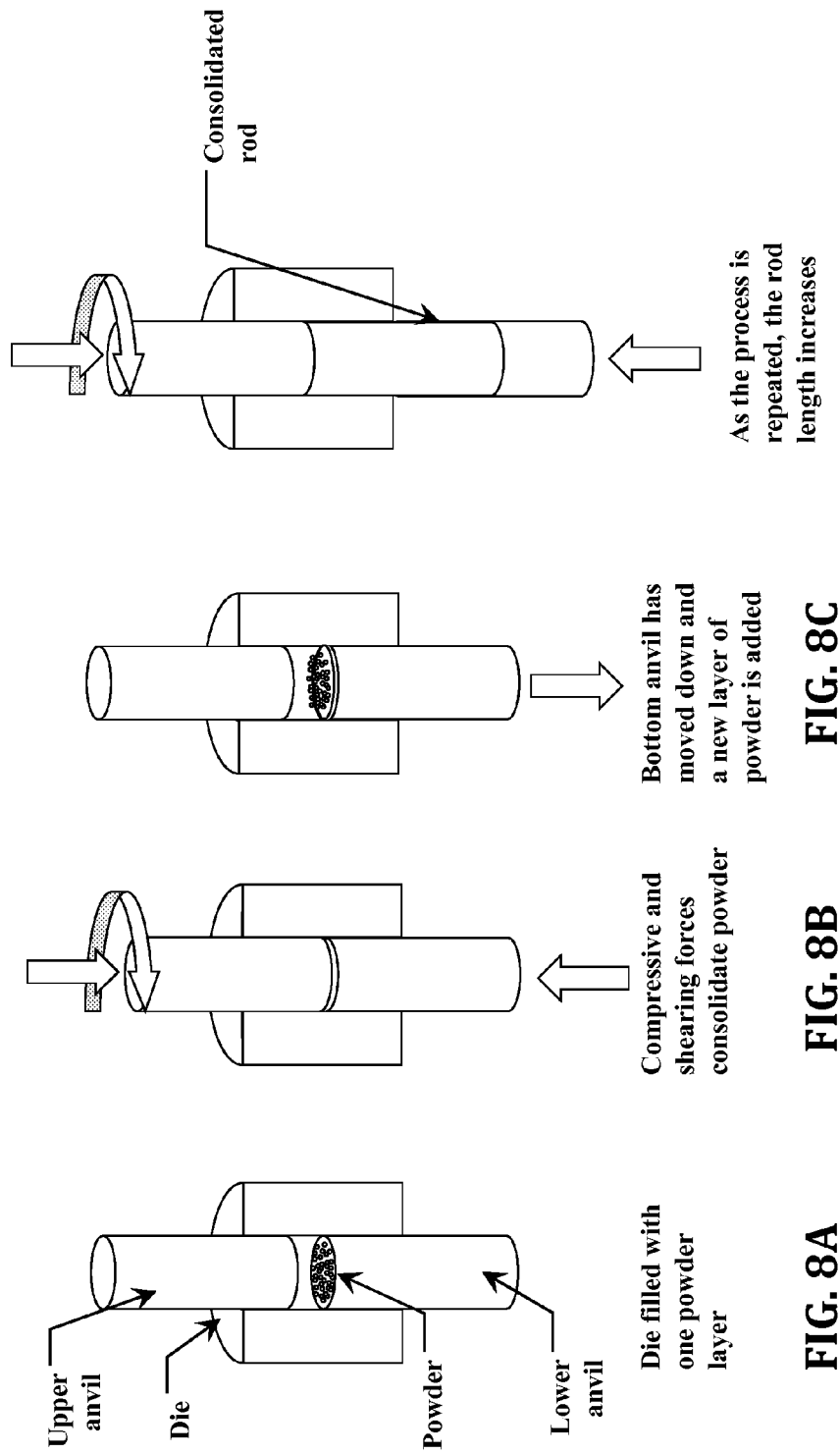
FIGS. 8A-D

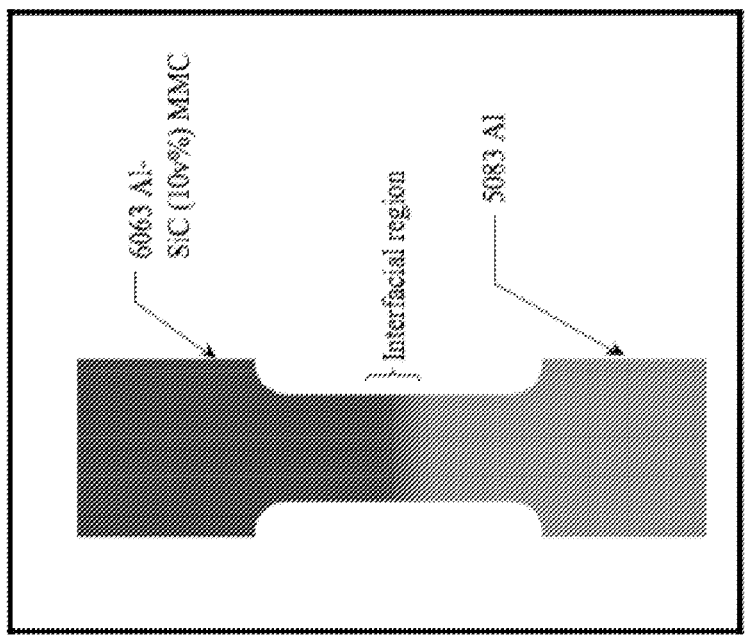
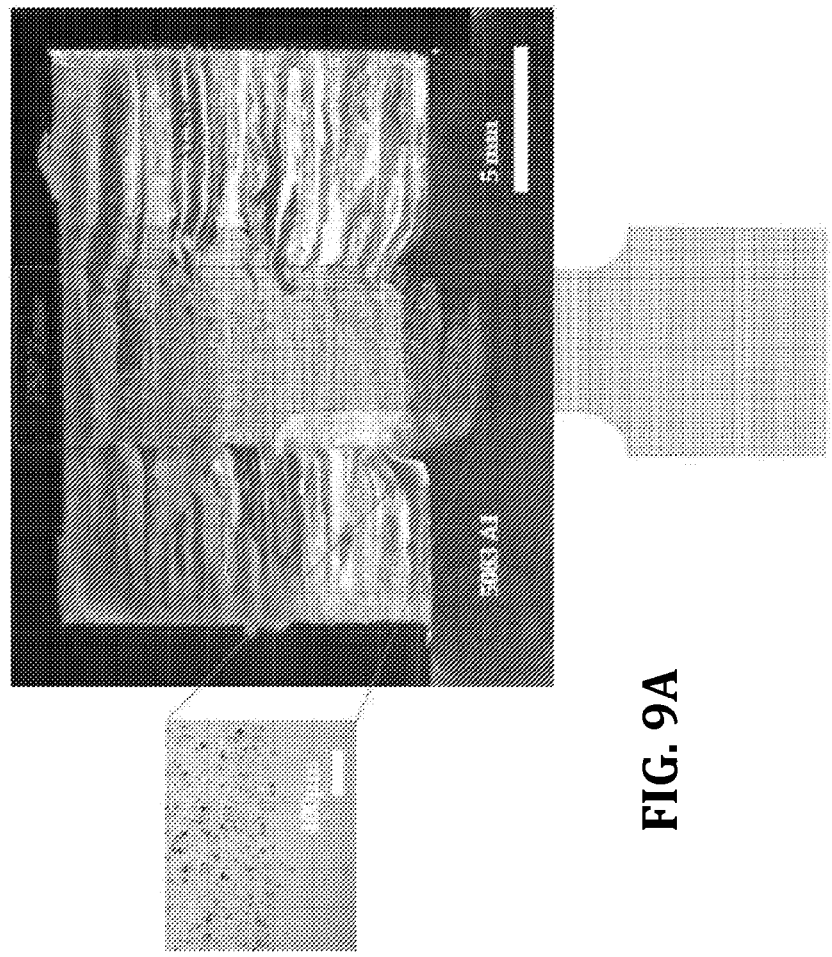
FIGS. 9A-B

FRICTION FABRICATION TOOLS

CROSS-REFERENCE TO RELATED APPLICATIONS

This application is a Continuation-in-Part (CIP) Application of U.S. application Ser. No. 12/792,655, filed on Jun. 2, 2010, which is a CIP of U.S. application Ser. No. 11/527,149, filed on Sep. 26, 2006, which claims priority to and the benefit of the filing date of U.S. Provisional Application No. 60/720,521, filed Sep. 26, 2005; and this application claims priority to and the benefit of the filing date of U.S. Provisional Application No. 61/293,543, filed Jan. 8, 2010, the disclosures of each of which is hereby incorporated by reference herein in their entireties.

STATEMENT OF GOVERNMENT INTEREST

This invention was supported by the U.S. Office of Naval Research under Contract No. N00014-05-1-0099. The U.S. Government has certain rights in this invention.

BACKGROUND OF THE INVENTION

1. Field of the Invention

The present invention relates to tools and methods for disposing, coating, repairing, or otherwise modifying the surface of a metal substrate using frictional heating and compressive loading of a consumable metal against the substrate. Embodiments of the invention include friction-based fabrication tooling comprising a non-consumable member with a throat and a consumable member disposed in the throat, wherein the throat is operably configured such that during rotation of the non-consumable member at a selected speed, the throat exerts normal forces on and rotates the consumable member at the selected speed; and comprising means for dispensing the consumable member through the throat and onto a substrate using frictional heating and compressive loading.

2. Description of Related Art

Conventional coating techniques, such as flame spray, high-velocity oxygen fuel (HVOF), detonation-gun (D-Gun), wire arc and plasma deposition, produce coatings that have considerable porosity, significant oxide content and discrete interfaces between the coating and substrate. Typically, these coating processes operate at relatively high temperatures and melt/oxidize the material as it is deposited onto the substrate. Such conventional techniques are not suitable for processing many types of substrates and coating materials, such as nanocrystalline materials due to the grain growth and loss of strength resulting from the relatively high processing temperatures.

An alternative deposition process available is referred to as cold spray type depositing. Such techniques typically involve a relatively low-temperature thermal spray process in which particles are accelerated through a supersonic nozzle. These techniques, however, may be relatively expensive and/or generally incapable of processing high aspect ratio particles, such as nanocrystalline aluminum powder produced by cryomilling. As a result, products prepared using cold spray techniques typically contain oxide impurities.

In light of these drawbacks, improvements in coating deposition techniques are highly desired. Indeed, there is a specific need for friction-based fabrication tools capable of depositing coatings on substrates efficiently and in a simple manner, which result in high quality adhesions between the substrate and coating and high strength products having an increased resistance to failure.

SUMMARY OF THE INVENTION

An embodiment of the present invention provides a friction-based fabrication tool comprising: a non-consumable body formed from material capable of resisting deformation when subject to frictional heating and compressive loading and a throat defining a passageway lengthwise through the body and comprising means for exerting normal forces on a material in the throat during rotation of the body.

Specific embodiments of the invention include a friction-based fabrication tool comprising: a non-consumable member having a body and a throat; wherein the throat is shaped to exert a normal force on a consumable coating material disposed therein for imparting rotation to the coating material from the body when rotated at a speed sufficient for imposing frictional heating of the coating material against a substrate; wherein the body is operably connected with means for dispensing and compressive loading of the coating material from the throat onto the substrate and with means for rotating and translating the body relative to the substrate; wherein the body comprises a surface for trapping coating material loaded on the substrate in a volume between the body and the substrate and for forming and shearing a surface of a coating on the substrate.

Other specific embodiments include friction-based fabrication tools comprising: (a) a spindle member comprising a hollow interior for housing a coating material disposed therein prior to deposition on a substrate; wherein the interior of the spindle is shaped to exert a normal force on the coating material disposed therein for rotating the coating material during rotation of the spindle; (b) means, in operable communication with the spindle, for dispensing and compressive loading of the coating material from the spindle onto the substrate and with means for rotating and translating the spindle relative to the substrate; and wherein the spindle comprises a shoulder surface with a flat surface geometry or a surface geometry with structure for enhancing mechanical stirring of the loaded coating material, which shoulder surface is operably configured for trapping the loaded coating material in a volume between the shoulder and the substrate and for forming and shearing a surface of a coating on the substrate.

In some embodiments, the means for exerting normal forces on a material in the throat during rotation of the body may be a throat having a non-circular cross-sectional shape. Additionally, any filler material may be used as the coating material, including consumable solid, powder, or powder-filled tube type coating materials. In the case of powder-type coating material, the powder can be loosely or tightly packed within the interior throat of the tool, with normal forces being more efficiently exerted on tightly packed powder filler material. Packing of the powder filler material can be achieved before or during the coating process.

Further provided are tooling configurations comprising any configuration described in this application, or any configuration needed to implement a method according to the invention described herein, combined with a consumable coating material member. Thus, tooling embodiments of the invention include a non-consumable portion (resists deformation under heat and pressure) alone or together with a consumable coating material or consumable filler material (eg, such consumable materials include those that would deform, melt, or plasticize under the amount of heat and pressure the non-consumable portion is exposed to).

Another aspect of the present invention is to provide a method of forming a surface layer on a substrate, such as repairing a marred surface, building up a surface to obtain a substrate with a different thickness, joining two or more substrates together, or filling holes in the surface of a substrate. Such methods can comprise depositing a coating material on the substrate with tooling described in this application, and optionally friction stirring the deposited coating material, eg, including mechanical means for combining the deposited coating material with material of the substrate to form a more homogenous coating-substrate interface. Depositing and stirring can be performed simultaneously, or in sequence with or without a period of time in between. Depositing and stirring can also be performed with a single tool or separate tools, which are the same or different.

Particular methods include depositing a coating on a substrate using frictional heating and compressive loading of a coating material against the substrate, whereby a tool supports the coating material during frictional heating and compressive loading and is operably configured for forming and shearing a surface of the coating.

In embodiments, the tool and coating material preferably rotate relative to the substrate. The tool can be attached to the coating material and optionally in a manner to allow for repositioning of the tool on the coating material. Such embodiments can be configured to have no difference in rotational velocity between the coating material and tool during use. The coating material and tool can alternatively not be attached to allow for continuous or semi-continuous feeding or deposition of the coating material through the throat of the tool. In such designs, it is possible that during use there is a difference in rotational velocity between the coating material and tool during the depositing. Similarly, embodiments provide for the coating material to be rotated independently or dependently of the tool.

Preferably, the coating material is delivered through a throat of the tool and optionally by pulling or pushing the coating material through the throat. In embodiments, the coating material has an outer surface and the tool has an inner surface, wherein the outer and inner surfaces are complementary to allow for a key and lock type fit. Optionally, the throat of the tool and the coating material are capable of lengthwise slideable engagement. Even further, the throat of the tool can have an inner diameter and the coating material can be a cylindrical rod concentric to the inner diameter. Further yet, the tool can have a throat with an inner surface and the coating material can have an outer surface wherein the surfaces are capable of engaging or interlocking to provide rotational velocity to the coating material from the tool. In preferred embodiments, the coating material is continuously or semi-continuously fed and/or delivered into and/or through the throat of the tool. Shearing of any deposited coating material to form a new surface of the substrate preferably is performed in a manner to disperse any oxide barrier coating on the substrate.

Yet another aspect of the present invention is to provide a method of forming a surface layer on a substrate, which comprises filling a hole in a substrate. The method comprises placing powder of a fill material in the hole(s), and applying frictional heating and compressive loading to the fill material powder in the hole to consolidate the fill material.

A further aspect of the invention provides a method of making consumable rod stock. The method comprises placing powder of a coating material in a die, applying frictional heating and compressive loading to the coating material powder in the die to consolidate the coating material, and recovering a rod comprising the consolidated coating material.

These and other aspects of the present invention will be more apparent from the following description. The features and advantages of the present invention will be apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

FIGS. 1A-C are schematic illustrations of various embodiments of friction-based tools according to the invention comprising various shaped throats or interiors.

FIGS. 2A and 2B schematically illustrate an exemplary process for depositing coating material on a substrate using tooling with a square through hole configuration.

FIGS. 3A-G are schematic illustrations demonstrating various surface geometries for the shearing shoulder of exemplary tools of the invention.

FIGS. 6A-D schematically illustrate a friction-based fabrication process in accordance with an embodiment of the present invention.

FIGS. 8A-8D schematically illustrate a method of making a consumable rod in accordance with an embodiment of the present invention.

FIGS. 9A and 9B are photomicrographs of a 5083 Al/6063 Al—SiC (10 vol. %) FSF sample, showing the substrate, friction-based fabricated coating, and interfacial region.

DETAILED DESCRIPTION OF VARIOUS EMBODIMENTS OF THE INVENTION

Figure 4:
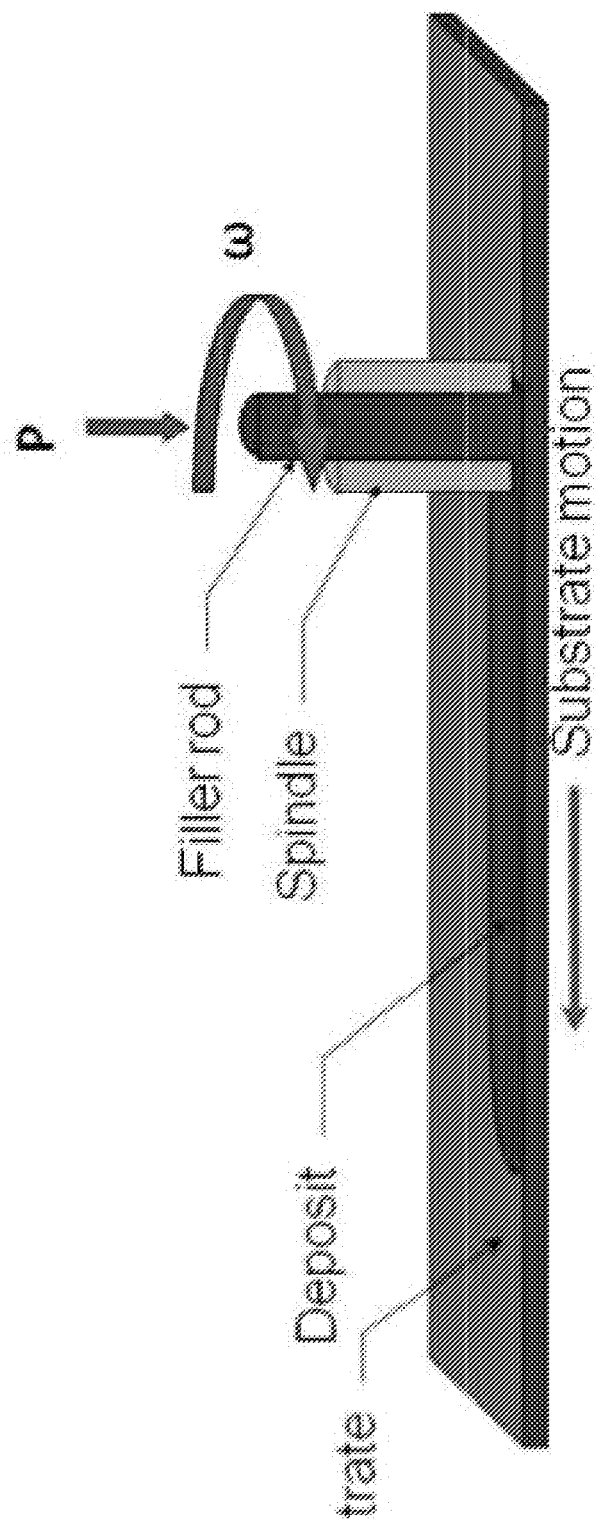
FIG. 4 schematically illustrates a friction-based fabrication process in accordance with an embodiment of the present invention.

The present invention is directed to the field of friction-based fabrication. More particularly, the present invention relates to coating, surface modification and repair of substrates using friction-based fabrication tools, to techniques and tool configurations for performing such processes, and to the production of such tools. Friction-based fabrication tools of embodiments of the invention include configurations capable of imparting frictional heating, compressive loading, and/or mechanical stirring of the coating material and/or substrate material during processing to allow for the coating material to be applied, adhered, deposited, and/or intermixed with the material of the substrate to form a coating on the substrate. As discussed in detail below, the present invention allows for the use of different coatings providing improved results in the applications in which they are sometimes used.

It is noted that in the examples and description provided in this application, various modifications can be made and are also intended to be within the scope of the invention. For example, the described methods can be practiced using one or more of the method steps described, and in any order. Further, method steps of one method may be interchanged and/or combined with the steps of other methods described and/or with method steps known to those of ordinary skill in the art. Likewise, the features and configurations for particular tooling described in this application may be omitted, interchanged, and/or combined with other features described or known to those of ordinary skill in the art. Even further, tooling to obtain certain results or to perform specific steps of methods described in this application is also included in the scope of the invention even though the particular details of such tools are described relative to performing method steps instead of the tools themselves.

Very generally, embodiments of the present invention are directed to tooling and techniques for friction-based fabrication of metal substrates. Such techniques include applying coating materials to a substrate by forming a surface layer on a substrate, eg, by depositing a coating on a substrate using frictional heating and compressive loading of a coating material against the substrate, whereby a tool supports the coating material during frictional heating and compressive loading and is operably configured for forming and shearing a surface of the coating.

Such methods can include depositing a coating material on a substrate with frictional heating and compressive loading of the coating material against a surface of the substrate; and spreading the coating material across the substrate by translating, relative to one another, a tool and the substrate, wherein the tool comprises a shoulder for trapping and shearing coating material below the shoulder.

Even further, general methods of forming a surface layer on a substrate can include depositing a coating material on a substrate by pressing and translating the coating material against and across the substrate while rotating the coating material with a tool which causes frictional heating of the coating material and substrate.

Friction-based fabrication tooling for performing such methods are preferably designed or configured to allow for a consumable coating material to be fed through or otherwise disposed through an internal portion of a non-consumable member, which may be referred to as a throat, neck, center, interior, or through hole disposed through opposing ends of the tool. This region of the tool can be configured with a non-circular through-hole shape.

As shown in FIGS. 1A-1C, various interior geometries for the tooling are possible. With a non-circular geometry, shown in FIGS. 1A and 1B, the consumable filler material is compelled or caused to rotate at the same angular velocity as the non-consumable portion of the tool due to normal forces being exerted by the tool at the surface of the tool throat against the feedstock. Such geometries include a square through-hole (FIG. 1A) and an elliptical through-hole (FIG. 1B) as examples. In configurations where only tangential forces can be expected to be exerted on the surface of the filler material by the internal surface of the throat of the tool, the feed stock will not be caused to rotate at the same angular velocity as the tool. Such an embodiment is shown in FIG. 1C, where a circular geometry for the cross-section of the tool in combination with detached or loosely attached feedstock, would be expected to result in the coating material and tool rotating at different velocities.

More specifically, the magnitude of force transferred from the rotating tool to the filler material is dependent on the coefficient of friction between the two. Thus, if the coefficient of friction is significantly low and the inertial force required to induce rotation of the filler material is significantly high, then the tool can rotate without inducing rotation (or with inducing rotation at a lower speed than the tool) in the cylindrical filler material. Under some circumstances during operation, differences in rotational velocity between the tool and the filler or coating material within the tool can lead to some coating material being deposited inside the tool, an accumulation of which can be problematic. Having the specific interior tool geometries described in this application can reduce this issue, such as appropriately sized square-square or elliptical-elliptical shaped filler-dispenser geometries. Another way of reducing the difference in rotational velocity between the tool and the filler material is to manufacture coating material rods that will fit tightly within the throat of the tool, or to otherwise tightly pack the filler material into the throat of the tool.

Any shape of the cross section of the interior of the tool that is capable of exerting normal forces on a coating material within the tool can be used. The throat surface geometry and the filler material geometry can be configured to provide for engagement and disengagement of the tool and coating material, interlocking of the tool and feed material, attachment of the tool and feed material, whether temporary or permanent, or any configuration that allows for the filler material to dependently rotate with the tool.

The interior surface shape of the tool (the throat) and the corresponding shape of the filler material may not be critical and can be constructed in a manner suitable for a particular application. Shapes of these surfaces can include, but are by no means limited to, square, rectangular, elliptical, oval, triangular, or typically any non-circular polygon. Additional shapes may include more distinctive shapes such as a star, daisy, key and key-hole, diamond, to name a few. Indeed, the shape of the outside surface of the filler material need not be the same type of shape as the surface of the throat of the tool. For example, there may be advantages from having a filler material rod with a square cross-section for insertion into a tool throat having a rectangular cross-section, or vice-versa where a filler material rod having a rectangular cross-section could be placed within a tool throat having a square cross-section in which the corners of the filler material rod could contact the sides of the square throat instead of sides contacting sides. Particular applications may call for more or less forces to be exerted on the coating material within the throat during operation of the tool. With concentric shapes and very close tolerance between the filler material and the tool certain advantages may be realized. Additionally, different shapes may be more suitable for different applications or may be highly desired due to their ease of manufacturing both the interior of the tool and corresponding filler material rods. One of ordinary skill in the art, with the benefit of this disclosure, would know the appropriate shapes to use for a particular application.

FIGS. 2A and 2B provide schematic drawings illustrating exemplary dimensions for tooling according to the invention as well as use of such tooling in friction-based fabrication methods. Even though other shapes may be used to achieve the results of this invention, exemplified in FIG. 2A is a tool with a square through hole. Even though it may be preferred to configure feed material with the same shape and/or a slightly smaller size in diameter, the form of the consumable material can be of any form or shape, such as solid, powder, composite, solid tubes filled with powder, to name a few.

FIG. 2B shows how coating material can be deposited on a substrate using a downward frictional force in combination with translational movement across the surface of the substrate at a fixed distance. The filler material is consumed by being forced toward and deposited on the surface of the substrate through the throat of the non-consumable tool using rotation of the tool (and consequently the feed material) and other relative movement between the tool and the substrate such as translational movement. The downward force can be imposed on the filler rod for example by pulling or pushing the material through the throat of the tool. A preferred method is to push the rod with an actuator toward the surface of the substrate. As shown, the use of a non-circular through-hole and corresponding shape of filler material may be one example of a way to compel the material in the tool to spin at the same angular velocity as the tool. It has been found that rotational movement of the filler material may be desired for certain applications and that no rotational movement between the filler material and inner geometry of the non-consumable portion of the tool be experienced during use. Further, it is desired that the filler material be operably configured to move freely lengthwise through the tool so as to allow for semi-continuous or continuous feeding of the material toward the substrate for a desired period of time.

The tooling in some embodiments comprises a shearing surface. This surface is used for shearing the surface of the coating material being deposited to form a new surface of the substrate. The shearing surface can be incorporated in the tool in a variety of ways, including to obtain tooling comprising a collar, spindle, anvil, cylindrical tool, shoulder, equipment, rotating tool, shearing tool, spinning tool, stir tool, tool, tool geometry, or threaded-tapered tool to name a few. The shearing surface is defined more completely by its function, e.g., the surface(s) of the tool capable of trapping, compressing, compacting or otherwise exerting at least a downward (ie, normal) force on the coating material deposited on the substrate and through the coating material to the substrate.

For example, any known shearing surface geometry can be used including those described in UK Patent Application No. GB 2,306,366, which is hereby incorporated by reference herein in its entirety. Further, for example, shoulder surface geometries of tools of the present invention can include the exemplary surface geometries shown in FIGS. 3A-G, which are provided as examples only and are not intended to limit embodiments of the invention. Other variations in the shearing surface are possible and are included in the invention, such as modifications that may be apparent to those of ordinary skill in the art desired for particular applications.

Figure 5:
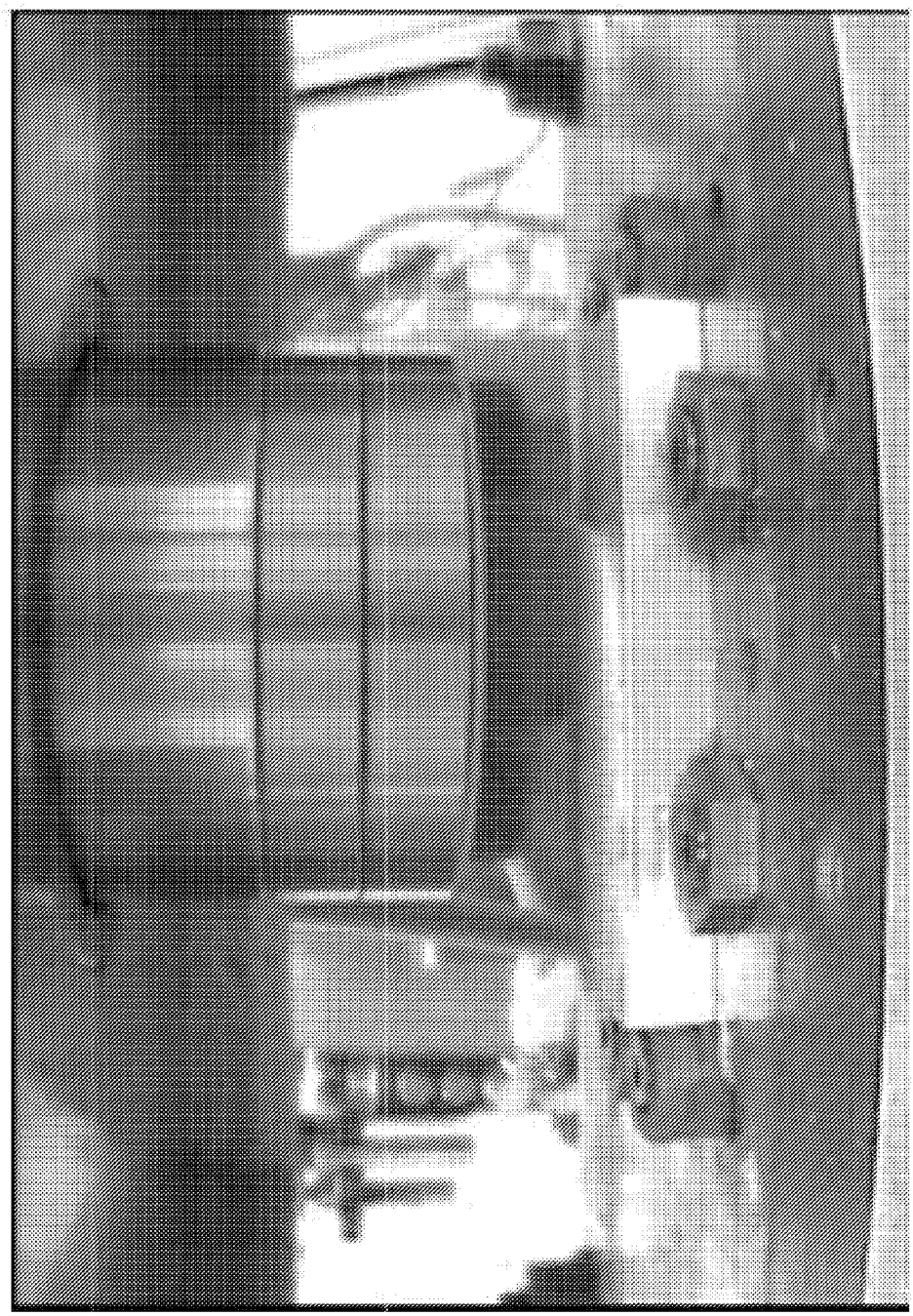
FIG. 5 is a photograph illustrating an exemplary method and tooling of the invention for applying a 6061 Al coating to a 6061 Al substrate.

As shown in FIGS. 4 and 5 and in certain embodiments of the present invention, friction-based fabrication may be used to add new material to the surfaces, thus modifying the surface compositions to address multiple application requirements. In embodiments, friction-based fabrication may be a solid state, friction-based coating method that can be used, for example, to meet naval needs for welding, coating and repair of aluminum vessels. Friction-based fabrication according to the invention uses shear-induced interfacial heating and plastic deformation to deposit wrought metal and/or metal matrix composite (MMC) coatings on substrates. FIGS. 4 and 5, which provide a photo and schematic drawing of a 6061 Al coating being applied to a 6061 Al substrate, illustrate an exemplary process of the invention.

Figure 10B:
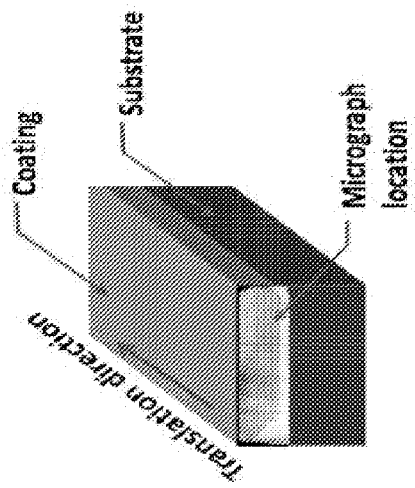
FIG. 10B is a schematic illustrating orientation of the micrograph of FIG. 10A with respect to relative translation.
Figure 10A:
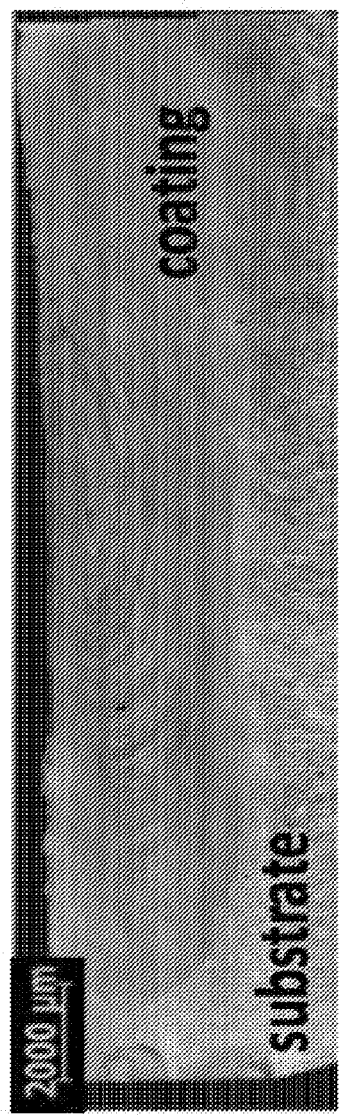
FIG. 10A is a photomicrograph illustrating a typical coating produced according to embodiments of the invention showing a transverse microstructure of 5083 Al.

In this friction-based fabrication process embodiment, the coating/filler material (for example, solid bar or powder) can be fed through the rotating spindle where frictional heating occurs at the filler/substrate interface due to the rotational motion of the filler and the downward force applied. The mechanical shearing that occurs at the interface acts to disperse any oxides or boundary layers, resulting in a metallurgical bond between the substrate and coating. As the substrate moves (or with any relative motion between the substrate and tool), the coating can be extruded under the rotating shoulder of the tool. FIG. 10A shows a typical coating transverse microstructure for 5083 Al (coating and substrate) and its orientation relationship with respect to the substrate and translation directions is shown in FIG. 10B. Typical translation speeds are approximately 1-3 inches per minute, however, with particular tool design and/or materials being used, it is possible that the translation speed could be increased to 10 inches per minute or faster.

One embodiment of the present invention provides a friction-based coating method otherwise referred to as friction-based fabrication, in which material is deposited onto a substrate and subsequently stirred into the substrate using friction stir processing to homogenize and refine the microstructure. Certain advantages of this solid-state process include, but are not limited to, the capability of depositing coatings, including nanocrystalline aluminum and/or metal matrix composites and the like, onto substrates such as aluminum at relatively low temperatures. The capability to deposit the substrates at such low temperatures allows for the ability to use a broader range of substrates, thereby being able to form improved friction stir tools for multiple applications. Coatings produced using friction-based fabrication have other advantages, such as superior bond strength, density, and lower oxide content as compared to other coating technologies in use today. The friction-based fabrication process may also be used to fill holes in various types of substrates, thereby making them stronger. Also provided by embodiments of the invention are methods of making rod stock.

MMC (metal-matrix composite) coatings can be formed in the same manner as a wrought coating, including by having the matrix alloy and the reinforcement feed through the spindle. However, the MMC consumable feed materials can be made by several methods, including but not limited to: 1) the matrix metal and reinforcement powders can be mixed and used as feed material or 2) a solid rod of matrix can be bored (e.g., to create a tube or other hollow cylinder type structure) and filled with reinforcement powder, or mixtures of MMC and reinforcement material. In the latter, mixing of the matrix and reinforcement can occur further during the fabrication process.

Figure 11:
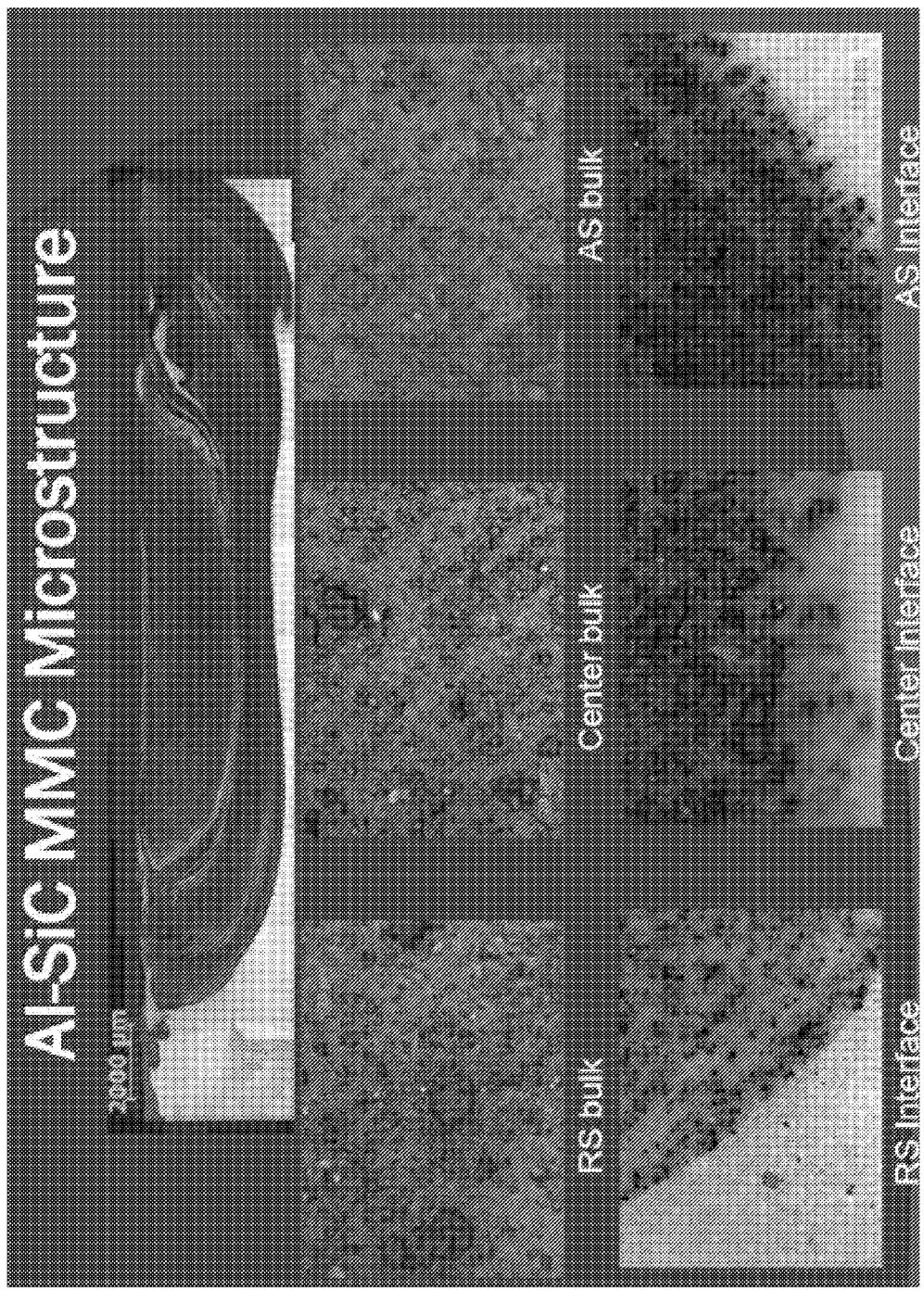
FIG. 11 illustrates optical photomicrographs of Al—SiC MMC coating. The top micrograph illustrates the entire transverse section and the bottom micrographs illustrate higher magnification micrographs of the specific locations shown by the squares.

FIG. 11 shows the microstructure of a 6061 Al—SiC MMC coating on a 6061 Al substrate produced by friction-based fabrication. In this case, the volume fraction (vol %) of SiC reinforcement is approximately 15-20%. The micrographs show that SiC is homogenously distributed in the coating and that there is no discrete interface between the matrix metal and substrate—continuity of the Al is maintained as the local volume fraction of SiC goes to zero.

Figure 12:
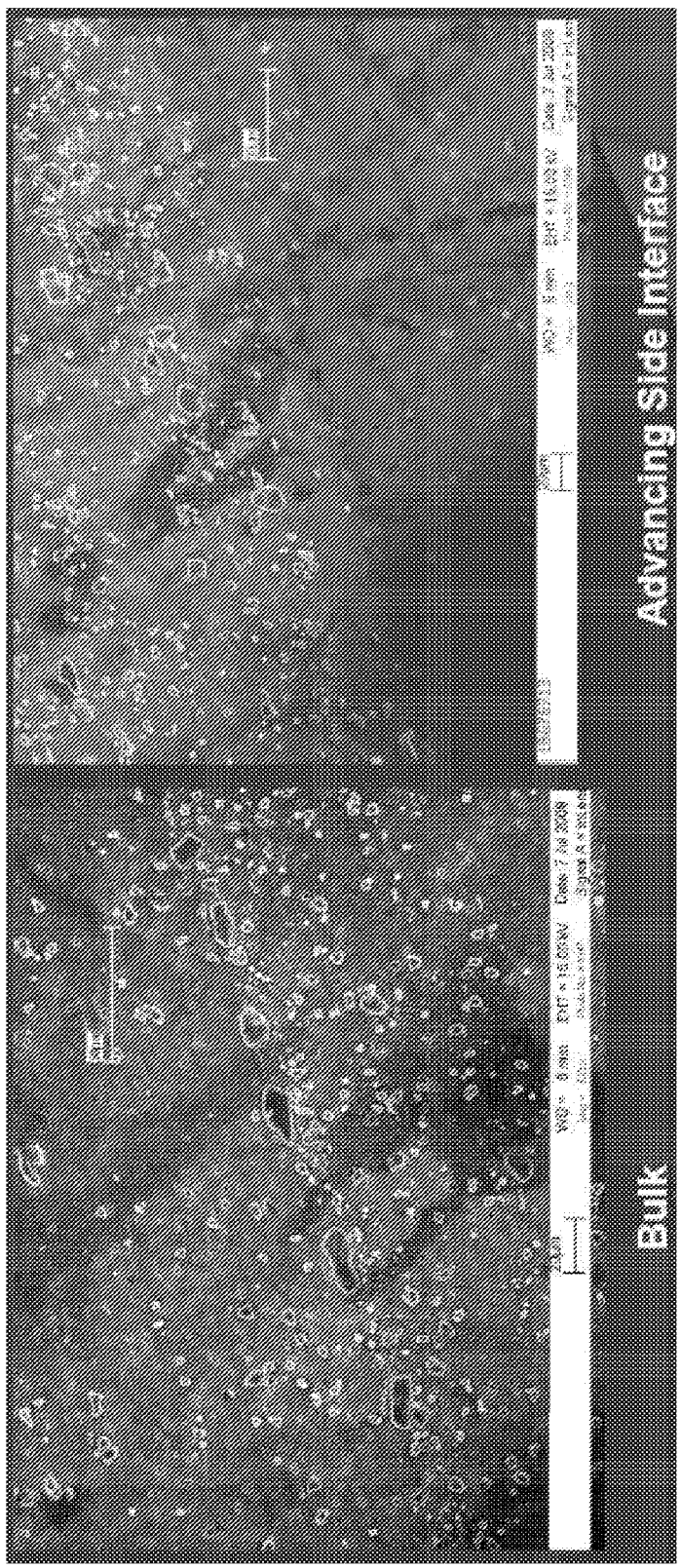
FIG. 12 illustrates an SEM image of the 6061 Al—SiC MMC microstructure indicating banding.

FIG. 12 is an SEM image of 6061 Al—SiC MMC microstructure indicating banding.

The bond strength between the MMC coating and substrate was tested by fabricating a 0.5 inch tall Al—SiC (10 vol %)

rib on a 5083 Al and machining micro-tensile samples with the coating/substrate interface in the middle of the gage section, a shown in FIGS. 12A-B and FIGS. 9A-B. Representative tensile stress-strain curves for the 5083 Al-6063 Al—SiC (10 vol %) interface sample along with the UTS for 6063 Al T1 are shown in FIGS. 12A-B.

The results of the bond strength test show that the coating/substrate bond strength is equal to the UTS of the coating alloy and that the coating exhibits significant ductility/toughness. Additionally, Vickers macro-hardness testing indicated that 6063 Al FSF coatings with 10 vol % SiC increased the coating hardness from 47 MPa to 57 MPa, a 20% increase in hardness with only 10 vol % SiC.

Development of friction-based fabrication for Al alloys and MMCs has demonstrated the potential of the process to deposit wrought metal coatings and extend the operating envelope for Al alloys in corrosive and high-wear applications. Demonstrating MMC coatings with high interfacial bond strength and improved hardness provides a firm foundation for transitioning the technology to stronger, higher melting temperature materials, such as copper alloy CDA180 and 4340 steel.

Figures 13A, 13B:
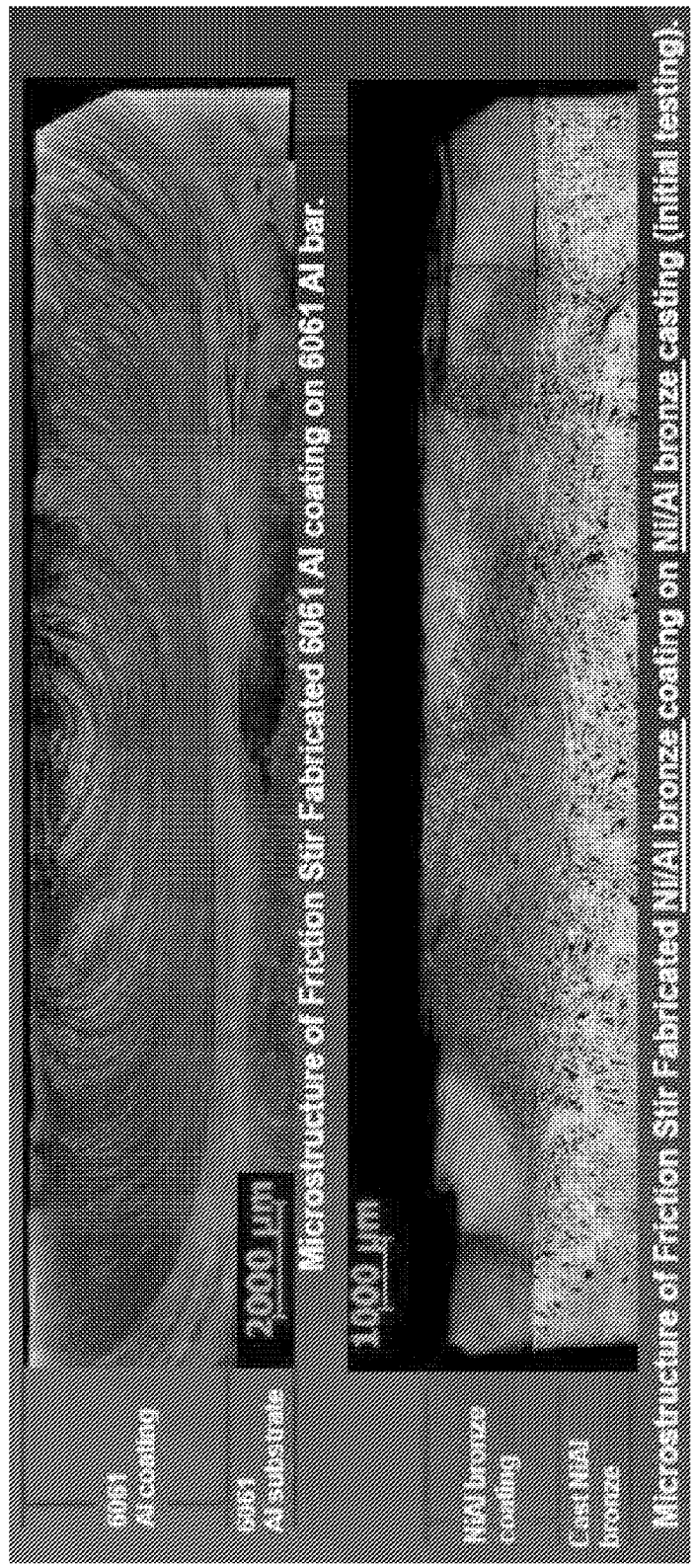
FIG. 13A is a photomicrograph of a 6061 Al coating on a 6061 Al bar prepared in accordance with tooling and methods of the present invention.
FIG. 13B is a photomicrograph of a Ni/Al bronze coating on a Ni/Al bronze casting prepared with tooling and methods of embodiments of the present invention.

Initial testing of FSF as a repair method for Ni—Al bronze casting was conducted on material provided by NSWCCD. In this demonstration, Ni—Al bronze was deposited by way of friction-based fabrication onto a Ni—Al bronze casting. The results of the demonstration were promising in that a coating with refined microstructure was deposited and the interface between the coating and substrate was diffuse in the processed region, as shown in FIG. 13B. As expected, the demonstration resulted in extreme wear of the H13 tool steel processing tool. Demonstrations with Ni—Al bronze with refractory tooling shows novel improvements.

According to embodiments of the invention, a friction-based fabrication method includes depositing a coating on a substrate using frictional heating and compressive loading of a consumable material on an upper surface of a substrate using one or more of the inventive tools described in this specification, and optionally further using additional friction stir processing to increase adhesion between the substrate and the coating. In applications where the coating is deposited on the substrate and a period of time is allowed to elapse prior to further processing, it is desired that the deposition technique involve imparting sufficient interfacial adhesion between the coating and substrate, such that further friction stir processing does not delaminate the coating from the substrate.

In embodiments, a coating material is deposited on a substrate using frictional heating and compressive loading of the coating material against the substrate. The coating material is a consumable material, meaning as frictional heating and compressive loading are applied during the process, the coating material is consumed from its original form and is applied to the substrate. Such consumable materials can be in any form including powders, pellets, rods, and powdered-filled cylinders, to name a few. More particularly, as the applied load is increased, beyond what would be required to join the consumable coating material to the substrate, and the portion of the coating material adjacent to the substrate is caused to deform under the compressive load. In preferred embodiments, the deformed metal is then trapped below a rotating shoulder of the friction-based coating tool and then sheared across the substrate surface as the substrate translates and rotates relative to the tool.

As shown in FIGS. 6-8, any of the tooling described in this application, and preferably the configurations demonstrated in FIGS. 1-8, is interchangeable and applicable to numerous coating, repairing, filling, and building up type applications, including for repairing holes in substrate surfaces, and for the manufacture of feedstock.

Such methods, for example, can include methods for friction-based coated substrate fabrication comprising: (a) compressive loading of a coating material against a surface of a substrate using a tool with a shoulder and throat; (b) frictional heating of the coating material on the substrate surface using the tool, which has a throat shaped to exert normal forces on the coating material disposed therein, to rotate the coating material with the tool at an effective speed; (c) translation of the tool relative to the substrate surface; and (d) trapping the coating material against the substrate surface with the shoulder of the tool and shearing of the coating material to form and deposit a coating on the substrate surface. It is preferred that in embodiments the throat of the tool is shaped with a non-circular cross-sectional shape. Further desired, are tooling wherein the throat of the tool is shaped to exert normal forces on a solid, powder, or powder-filled tube type coating material disposed therein. Embodiments may also include features to ensure the frictional heating and compressive loading are of a degree sufficient to enable mixing of dispensed coating material with material of the substrate at a coating-substrate interface.

The tools, and/or the shearing surface(s) of the tools, can be consumable, non-consumable, or a combination of both (eg, comprise consumable and non-consumable portions or members). Typically, the shoulder of the tool comprises a substantially flat surface geometry, such as the rotating collar shown in FIG. 6A, the stirring tool of FIG. 7D, and the upper anvil of FIG. 8A. Alternatively, the tools of the present invention can comprise a stepped surface geometry, pin-type surface, surface with one or more protrusions (such as the stir tool shown in FIG. 6D), or any surface geometry capable of delivering the desired amount of mechanical and/or frictional interaction with the substrate material and/or the coating material for a desired application.

More particularly, as shown in FIGS. 6A-D, schematic diagrams are provided to illustrate an exemplary method according to embodiments of the invention. FIGS. 6A-C illustrate one mode of deposition of a coating material onto a substrate. Even though the coating material in this embodiment is shown as a solid rod in cylindrical form, the consumable coating material can be in any number of forms, including powder, pellet, or fillable cylinders. Likewise, any interior geometry of the tool (ie, the throat geometry) can be used. Preferably, the consumable coating material will have one shape and the throat will have a complementary shape, such as both having correspondingly shaped and sized square cross sections, such as square-square cross sections.

Metallurgical bonding and/or homogenization and/or refinement of the microstructure between the substrate and coating can be achieved through rotation and/or translation or other relative movement between the tool and substrate. Such relative movement between substrate and tool, combined with means for compressing and retaining the coating material between the substrate and tool, can add additional frictional heating to the system. Likewise, the surface geometry of the tool can be modified to provide increased frictional processing of the materials, such as a tool with one or more pin-type projections, or a separate friction stir type tool. Frictional heating, compressive loading, and mechanical stirring are factors that can be adjusted to achieve a particular result.

More particularly, a tool embodiment as shown in FIG. 6A can comprise a collar or other non-consumable portion of the tool capable of being attached to a rod or other consumable portion. Typically, in such a configuration, the collar is ideally releasably engagable with the consumable rod. In this manner, as the coating material is consumed on the surface of the substrate, the collar can be repositioned on the material to provide for additional material to be deposited. Attachment of the coating material and non-consumable portion is preferred so that the coating material is caused to rotate at the same speed or simultaneously with the non-consumable portion of the tool. This function can be achieved in any number of ways, including by shaping the consumable portion of the tool as a rod having the same shape and size as the cross section of the throat of the non-consumable portion. It is recognized that some shape or size difference may be desired so that the consumable portion is capable of easily being inserted into the throat of the tool. If the cross sections of the two members are the same size and shape insertion and lateral movement through the throat may be difficult. Using similarly shaped and sized members, rotation of the non-consumable portion of the tool will cause normal forces to be imparted on the consumable portion present in the throat of the tool. Such normal physical forces will subsequently cause the internal member (consumable member) to rotate with the external member (non-consumable member).

To provide an amount of consumable coating material available for deposition on the substrate, in preferred embodiments it may be desired to leave approximately 3 mm of the rod beneath the collar or other shearing surface of the tool, or other volume of space applicable for obtaining a desired thickness of coating. As shown in FIG. 6B, this 3 mm section of the consumable portion of the tool can be pressed onto the substrate to a desired level of compressive loading, usually determined by the type of coating material being used. With the consumable and non-consumable portions of the tool physically secured together, either or both members can be pressed toward the substrate to cause the coating material to be deposited on the substrate. In this embodiment, rotation of the tool and substrate is also included. This relative movement between the substrate and the tool increases frictional heating of the overall system to facilitate deposition of the coating material on the surface of the substrate between the tool and the substrate.

As shown in FIG. 6C, if the collar or other shearing surface of the tool is maintained at a fixed distance from the upper surface of the substrate during processing, the coating material is spread evenly across the surface of the substrate.

Further homogenization, refinement, and increased interlayer adhesion can be accomplished using friction stir processing, as shown in FIG. 6D. For example, once the coating has been deposited onto the surface of the substrate, e.g., using the solid-state friction deposition method, it may then be friction stir processed to adhere the coating to the surface of the substrate and refine the coating microstructure. The goal of the friction stir process may be to produce a homogenous coating with a bond strength approaching the ultimate tensile strength of the base alloy. The quality of the friction stirred regions of the substrates may be optimized, including eliminating any defects or channels present along the length of the friction stir path. Elimination of the channel(s) may be achieved by using a friction stir tool with a threaded pin. By modifying the tool geometry, coated substrates may be produced without channels through the use of a threaded-tapered tool. Additional friction stir processing can be performed immediately after deposition, a period of time following deposition, or substantially simultaneously with deposition. The additional friction stir processing can be performed with a different tool having a desired geometry to accomplish a particular purpose. Indeed, a flat surface geometry of the tools will provide an amount of friction stir processing, while, increasing the surface area of the shearing surface of the tool with projections or other protruding structure(s) will provide additional friction stir capabilities and benefits. The coating deposited on the surface of the substrate can be achieved by using a single layer of deposited coating material or multiple layers applied until the desired coating thickness is achieved.

The coating material, in some embodiments, can be deposited and processed on the substrate in nanocrystalline form. As used herein, the term "nanocrystalline" means a material in which the average crystal grain size is less than 0.5 micron, typically less than 100 nanometers. Due to the fact that the friction-based fabrication process is carried out at a relatively low temperature below the melting point of the coating material, little or no crystal grain growth occurs during the process and the nanocrystalline structure of the coating material may be maintained in the coating as applied to the substrate.

In accordance with another embodiment of the present invention, the coating material comprises a metal matrix composite (MMC). As used herein, the term "metal matrix composite" means a material having a continuous metallic phase having another discontinuous phase dispersed therein. The metal matrix may comprise a pure metal, metal alloy or intermetallic. The discontinuous phase may comprise a ceramic such as a carbide, boride, nitride and/or oxide. Some examples of discontinuous ceramic phases include SiC, $TiB_2$ and $Al_2O_3$. The discontinuous phase may also comprise an intermetallic such as various types of aluminides and the like. For example, titanium aluminides such as TiAl and nickel aluminides such as $Ni_3Al$ may be provided as the discontinuous phase. The metal matrix may typically comprise Al, Cu, Ni, Mg, Ti, Fe and the like.

To produce Al—SiC metal matrix composite coatings, aluminum tubes may be filled with silicon carbide powder and used as coating rods. The filled tubes may yield an Al—SiC coating, but the volume fraction of the reinforcement may vary locally. However, for precise volume fraction control, homogenous metal matrix composite rods containing the appropriate volume fraction may be used instead of powder filled tubes.

Reinforcement of the metal matrix composite coating may be incorporated into the matrix by traditional blending techniques or grown in-situ from elemental metals with reaction synthesis. Table 1 lists MMC systems, eg, which can be formed by reaction synthesis.

TABLE 1

| Reaction Synthesis of In-situ MMCs Using FSF | |
|---|---|
| $Ti + xAl \rightarrow TiAl + (x - 1)Al$ | (Aluminum matrix with TiAl reinforcement) |
| $3Ni + yAl \rightarrow Ni_3Al + (y - 1)Al$ | (Aluminum matrix with $Ni_3Al$ reinforcement) |
| $2B + zTi \rightarrow TiB_2 + (z - 1)Ti$ | (Titanium matrix with $TiB_2$ reinforcement) |
| $Ti + wNi \rightarrow NiTi + (w - 1)Ni$ | (Nickel matrix with NiTi reinforcement) |

In reaction synthesis, elemental metals react due to the thermal and/or mechanical energy imparted during processing to form intermetallic or ceramic particulates. The rotation of the tool and feed material relative to the substrate may generate frictional heat which raises the temperature of the elemental constituents to that at which the reaction can initiate. As the reactions of elemental metals used for reaction synthesis are exothermic, additional heat is evolved in the formation of the intermetallic particles. An aspect of using friction-based fabrication to form in-situ MMC coatings is the fact that the shearing of the metal by the tool and rotation of the feed material cracks and disperses the oxide barrier coatings, which exist on all metal exposed to oxygen, providing a high concentration of the metal-to-metal contact required for the reaction to occur. In such reaction synthesis, the reacting metal may be provided from the substrate and the feed metal, or all of the reacting metals could be provided from the feed material.

In-situ MMCs may exhibit enhanced mechanical properties as compared to MMCs formed ex-situ, i.e., by blending the matrix and reinforcement. In-situ formation of MMCs yields relatively small single crystal reinforcements, which are thermodynamically stable in the matrix. In-situ formation results in clean, unoxidized particles, and the interfacial strength between the reinforcement and matrix may be higher than that of ex-situ MMCs.

Various types of substrates may be coated using the friction-based fabrication process of the present invention. For example, metal substrates comprising Al, Ni, Cu, Mg, Ti, Fe and the like may be coated. Furthermore, polymers and ceramics may be provided as the substrate. For example, the substrate may comprise a thermoplastic material.

In accordance with an embodiment of the present invention, the coating material may be deposited on the substrate at a temperature below a melting temperature of the coating material. The depositing (eg, loading) of the coating material can be performed using one or more method steps for example described above. Loading of the coating material onto the substrate may be performed at a temperature ranging from about 100 to 500° C. or more below the melting point of the coating material. When the coating material comprises Al, the material may be deposited on a substrate at a temperature below about 500° C., typically below about 400° C. Once the coating material is initially loaded onto the substrate, any subsequent friction stirring of the coating material and/or substrate material may also preferably be performed below the melting temperature of the coating material. For example, when the coating material comprises Al, friction stirring temperatures may be maintained below about 500° C., typically below about 400° C. Furthermore, the friction stirring process (es) may be performed at a temperature below a melting temperature of the substrate.

Another embodiment of the metal deposition method may significantly reduce the labor and time requirements. For example, the coating material to be deposited on the substrate may be delivered to the substrate surface using a "push" method, where a rotating-plunging tool pushes the filler material (such as a rod of finite length or an infinite amount of powder filler material can be fed into the tool body) through the rotating tool, such as a spindle. The spindle may be rotated independently using an additional motor while the milling machine rotates the plunging tool. As the spindle and plunging tool rotate, compressing loading and frictional heating of the filler material can be accomplished by pressing the coating material into the substrate surface with the downward force (force toward substrate) and rotating speed of the plunging tool. This design allows a large volume of raw material to be fed to the substrate surface as compared to manual methods. As the rod material may be spread onto the substrate, the plunging tool continues to feed more filler rod through the spindle onto the substrate. With machine design improvements, the length of rod stock may be increased.

This "push" method may be a feasible solution to the filler rod delivery challenge, but in the interest of processing speed and volume could be further improved upon. For continuous deposition, a "pull" method, where the spindle rotation pulls the rod into the spindle, may be employed so that the rod length can be increased and the rods can be fed continuously.

Other means for continuous feeding (continuously adding new material to the tool) or continuous deposition (continuous delivery of feedstock to the substrate) can be used. For example, using a feedstock in powdered or pellet form would allow for continuous feeding and continuous deposition of the coating material in and through the tool (ie, an infinite amount of feed material can be introduced to and deposited by the tool for an infinite period of time). Semi-continuous deposition through the tool may involve use of a rod to push the existing material (whether powder, pellet, or rod form) in the throat of the tool out and toward the substrate surface, whereby only the material in the tool can be used. Using such semi-continuous processes and techniques, the process is typically stopped periodically to add new material to the system.

Other continuous or semi-continuous methods for delivering the coating material to a surface of a substrate also exist, including using a threaded member to push or pull feedstock through the tool. For example, feedstock may be pulled into the throat or neck of the tool using an internally threaded section on the inner diameter of the spindle throat. Any type feedstock can be used, but a solid feedstock rod-type configuration is preferred to powder or pellet forms, but such forms are also capable of being pulled or pushed into the tool using one or more means for exerting a downward force on the material. During the deposition process, the spindle rotates at a slightly slower rate than the rotating rod stock. Due to the difference in rotational velocities, the threaded portion of the neck pulls the rod through the spindle and forces the metal under the rotating shoulder. The threads impart a force on the feedstock that pushes the feed material toward the substrate much like a linear actuator or pneumatic cylinder or other mechanical force pushing on a surface of the feedstock would.

The difference in rotational velocity between the rod and the spindle, coupled with the pitch of the internal threads in the spindle, would determine the coating deposition rate. It may be desired to actively control the temperature of the rod inside and outside the spindle so that the thermally induced softening of the filler rod is not totally dependent on frictional heating. Thermal control provides means to increase deposition rates to meet application requirements.

Figure 7A:
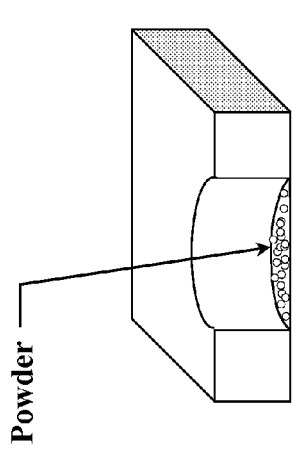
FIGS. 7A-F schematically illustrate a friction-based hole repair method in accordance with an embodiment of the present invention.
Figure 7B:
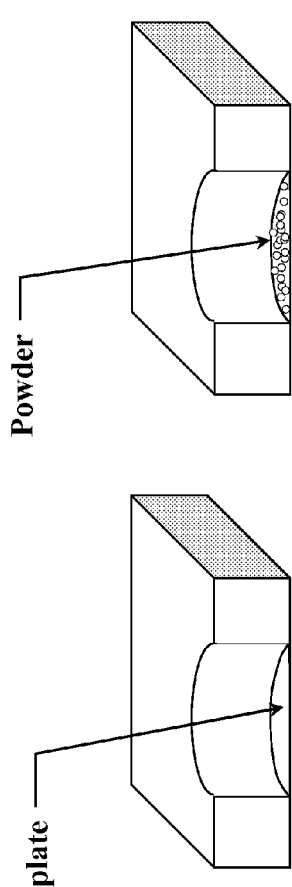
Figure 7C:
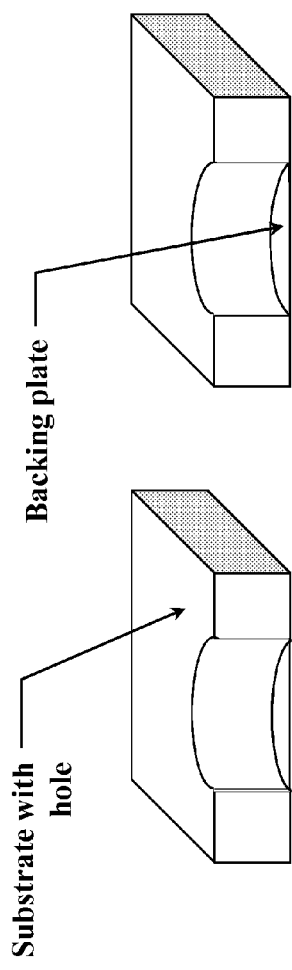
Figure 7D:
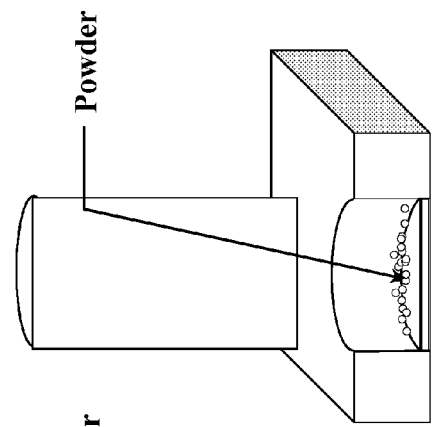
Figure 7E:
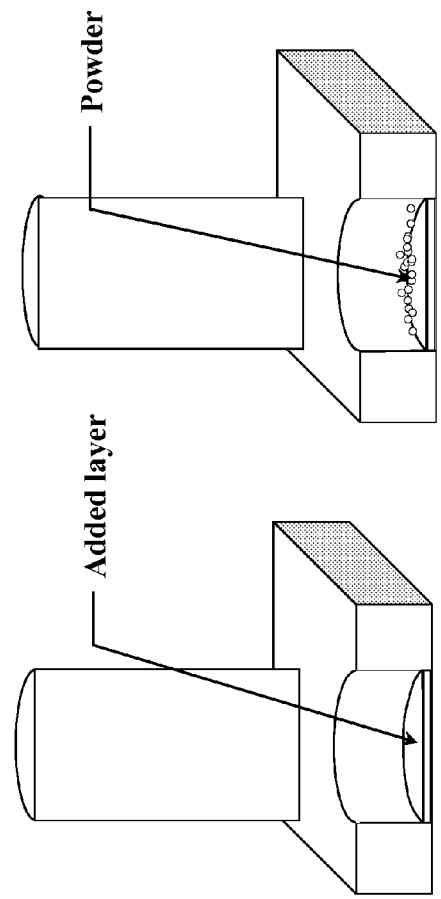
Figure 7F:
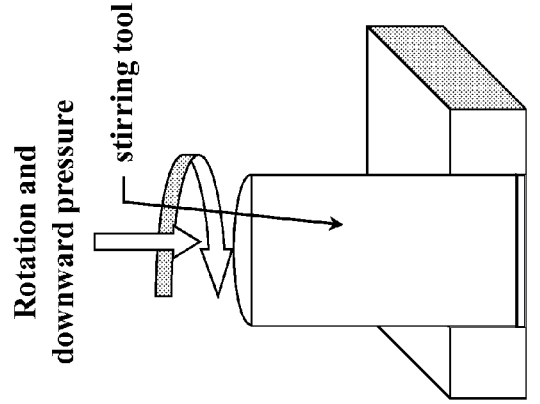

Yet another embodiment of the present invention provides a method of repairing holes in substrates, and a way to modify the local properties of a substrate. A hole repair method is illustrated in FIGS. 7A-F. As shown in FIG. 7A, the repair process begins with a substrate having a hole of known diameter. If the hole is not circular in cross-section or has an unknown or undesired diameter, it may be machined to create a hole equal to the diameter of the tool used in FIG. 7D. As shown in FIG. 7B, if the hole is a through-hole, it may be necessary to apply a backing plate, e.g., composed of either the substrate material or the filler material. The backing plate serves as a base for the friction processing to follow, and may be inset into the lower surface of the substrate if desired. As shown in FIG. 7C, a layer of loose powder is deposited into the hole, and subsequently processed using compressive loading and frictional heating into the backing plate or the bottom of the hole, as shown in FIG. 7D, with a tool subsequently equal in diameter to that of the hole. FIG. 7E illustrates the resultant layer of material added to the bottom of the hole. FIG. 7F illustrates the deposition of more loose powder into the hole, which may be processed as shown in FIG. 7D. This process may be repeated until the hole is filled. As the depth of the fill approaches the top of the substrate, flash material may accumulate around the surface of the hole. Once the fill depth reaches the substrate surface, the flash material may be cut away leaving a smooth surface.

The hole-repair method may be used to modify the properties of a surface. A series of holes with any given depth may be drilled into a substrate and then re-filled, using the hole-repair method, with a material having the desired local properties, thereby selectively modifying the local properties of the substrate. With multiple tools across the work volume, the processing time for an entire work piece may be reduced, and the ability to selectively vary the local microstructure may be readily accomplished. The processing time may be further decreased, by employing as the multiple tools, tools capable of automated delivery of the coating/filler material, for example, the push or pull methods described above.

Because material flexibility may be possible using the present process, the desired alloys and material volume fractions are not always readily available in the rod stock form needed for the raw material. As such, an aspect of the present invention may be to provide a stock fabrication method that uses powder as its raw material. This stock fabrication method provides the ability to produce cylindrical rods from a wide variety of materials and composites in various volume fractions. Further, in contrast to the cold spray coating method, this friction-based stock fabrication method may be able to process high aspect ratio particles, such as those produced through cryomilling, which allows for the inexpensive construction of nanocrystalline rods for deposition by friction-based fabrication.

A variation of the hole filling method may be used for production of rod stock to supply the solid-state friction deposition process described above. Because the hole filling method utilizes powder as its raw material, limitless material and volume fraction flexibility exists for production of rods and cylinders by this method. For example, the composition of the rod stock may be graded along its length, in which case coatings made from the rod during the friction-based fabrication process may have different compositions and properties which vary gradually from one area of the coating to another, e.g., one area of the coating may have relatively high hardness while another area may have relatively high corrosion resistance. To deposit advanced materials such as nanocrystalline aluminum and/or aluminum MMCs using the friction-based fabrication process, rod stock of these materials with predictable and repeatable volume fractions is desired. As these advanced materials are not commercially available in rod form, the present low-pressure high-shear powder compaction (LPHSPC) process, as shown in FIGS. 8A-8D, may be used to provide rods of coating materials for the friction-based fabrication process.

In one embodiment, LPHSPC may be accomplished by manually depositing approximately 0.25 g of powder into a cylindrical cavity, as schematically shown in FIG. 8A, and then manually applying a downward compaction force with a spinning cylindrical tool, as shown in FIG. 8B. As shown in FIGS. 8C and 8D, the powder deposition and processing steps are repeated. The downward pressure and shear from the tool compact the powder and adhere it to the previous layer. Fully dense sections of, e.g., ⅜ and ½-inch diameter, rods may be fabricated from microcrystalline and nanocrystalline aluminum powders using the manual method. However, rods of significant length may be fabricated by automated methods for use as feed stock for friction-based fabrication systems. Thus, constructing an automated low-pressure high-shear powder compaction unit may be desirable.

To supplement the above disclosure, additional examples are provided below. These examples are intended to illustrate various aspects of the invention, and are not intended to limit the scope of the invention.

Different deposition geometries are used to test the bond strength between 5083 Al and a ½ inch deposit of nanocrystalline Al (7 w % Mg, cryomilled 4 hrs); and test the bond strength between 5083 Al and a ½ inch deposit of 6063 Al—SiC (10 v %). Small tensile specimens were cut such that the 5083 Al substrate and the coating (nanocrystalline Al or Al—SiC) each composed half of the specimen and the interface plane between the coating and substrate was in the middle of the gauge length, normal to the loading direction.

Friction-based fabrication was used to coat 2519 and 5083 Al substrates:

2519 and 5083 Al plates with Al—SiC surface layers: the Al—SiC coating was comprised of 6063 Al and approximately 10 v % SiC powder (1 mm average particle size);

A 2519 Al plate with a copper-free surface to enhance the corrosion resistance—the copper-free coating was made from 6063 Al;

A 5083 Al plate with a nanocrystalline Al deposit to enhance the impact resistance: the nanocrystalline Al alloy contained 7 w % Mg, and was cryomilled for 4 hours;

A half-inch, curved Al—SiC rib on a 5083 Al plate: the rib was composed of 6063 Al and approximately 10 v % SiC powder (1 mm average particle size); and Repair of a 1-inch diameter hole in a 5083 Al plate without adversely affecting the plate microstructure: the material used was either commercially pure Al or nanocrystalline Al (due to machine limitations, the diameter of the hole was reduced to ½ inch).

Factors that influence the process' deposition rate are translation speed, tool diameter, layer thickness, and delays resulting from manual processes. The angular velocity of the spindle is an important variable from the perspective of frictional heating and deposition quality, but does not directly factor into the deposition rate unless poor deposition quality leads to necessary rework. Once the acceptable angular velocity range for the spindle is established for a given coating material, this variable will no longer have an impact on the deposition rate but could be used to manipulate the frictional heat input and thus the structure and properties of the coating. The deposition efficiency of the friction-based fabrication process is nearly 100%. Material waste (scrap) in the process occurs only when machining flash at the edge of the processed region. This waste can be minimized or eliminated in a number of ways, including process and product design.

A spindle capable of continuous deposition will eliminate manual intervention and setup delays, and allow material to be continuously fed through the spindle to the substrate surface. For continuous deposition, the material deposition rate will be equal to the product of the translation speed, shoulder diameter, and layer thickness.

Friction-based fabrication may be an effective and potentially efficient method of producing a variety of aluminum-based, copper-based, and other coatings. Using simplistic deposition equipment, the process is able to produce coatings, from advanced materials in the solid-state, with at least twice the bond strength of the most competitive coating technology. In addition, a wide variety of feed stock can be fabricated using the powder compaction process, allowing for wide-ranging material flexibility in coatings. It may be desirable to provide an automated coating unit that can perform reproducibly over a wide range of process parameters and is capable of in-situ process monitoring. Consistent performance and the ability to monitor spindle speed, torque, and deposition temperature will afford the ability to detail the link between the process and the coating structure and properties.

The present invention has been described with reference to particular embodiments having various features. It will be apparent to those skilled in the art that various modifications and variations can be made in the practice of the present invention without departing from the scope or spirit of the invention. One skilled in the art will recognize that these features may be used singularly or in any combination based on the requirements and specifications of a given application or design. Other embodiments of the invention will be apparent to those skilled in the art from consideration of the specification and practice of the invention. It is intended that the specification and examples be considered as exemplary in nature and that variations that do not depart from the essence of the invention are intended to be within the scope of the invention.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A friction-based coated substrate fabrication method comprising:
   compressive loading of a coating material against a surface of a substrate using a tool with a shoulder and throat, wherein the shoulder comprises a surface;
   frictional heating of the coating material on the substrate surface using the tool, which has a throat shaped to exert normal forces on the coating material disposed therein, to rotate the coating material with the tool at an effective speed;
   translation of the tool relative to the substrate surface; and
   trapping the coating material in a volume between the substrate surface and the shoulder surface and shearing of the coating material by contact with the shoulder surface to form and deposit a coating on the substrate surface.

2. The method of claim 1, wherein the throat of the tool is shaped with a non-circular cross-sectional shape.

3. The method of claim 2, wherein the throat of the tool is shaped to exert normal forces on a solid, powder, or powder-filled tube type coating material disposed therein.

4. The method of claim 1, wherein the frictional heating and compressive loading are of a degree sufficient to enable mixing of dispensed coating material with material of the substrate at a coating-substrate interface.

* * * * *